Figure 1:
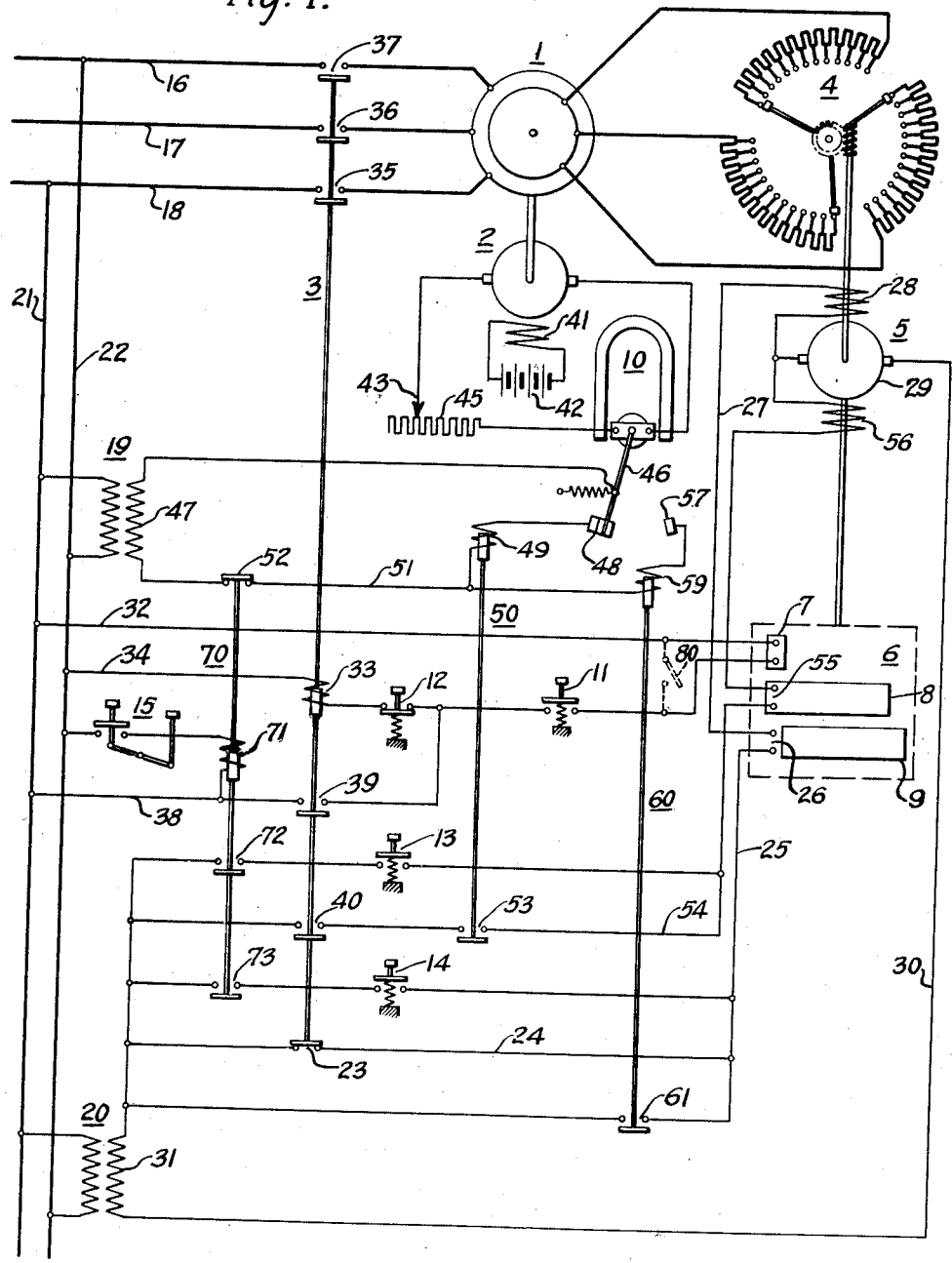

Feb. 1, 1938.  F. D. SNYDER  2,106,858
MOTOR CONTROL SYSTEM
Filed Aug. 14, 1936  2 Sheets-Sheet 1

WITNESSES:

INVENTOR
Frederick D. Snyder.
BY
Paul E. Friedemann
ATTORNEY

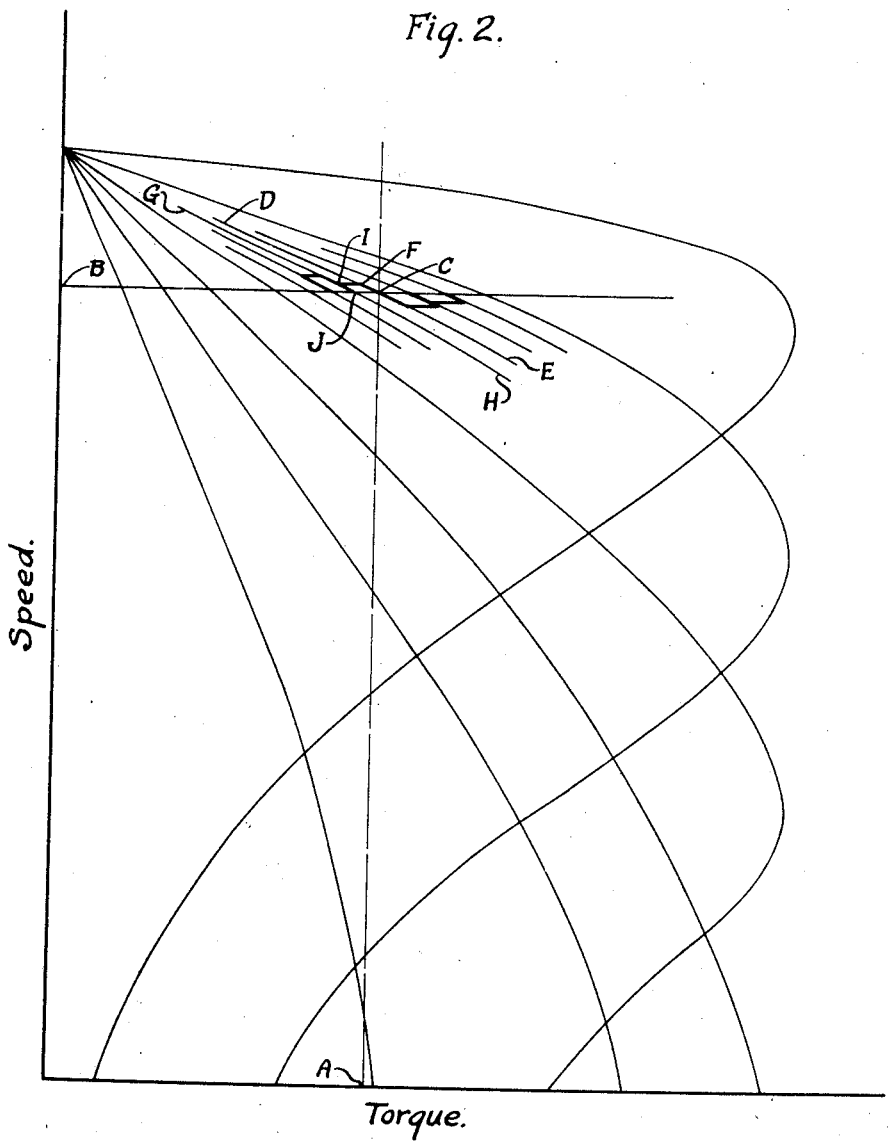

Patented Feb. 1, 1938

2,106,858

UNITED STATES PATENT OFFICE 2,106,858

MOTOR CONTROL SYSTEM

Frederick D. Snyder, East Milton, Mass., assignor to Westinghouse Electric & Manufacturing Company, East Pittsburgh, Pa., a corporation of Pennsylvania Application August 14, 1936, Serial No. 95,966

4 Claims. (Cl. 172—179)

My invention relates to systems of control for electric motors, that is, more particularly to systems of control for wound rotor induction motors.

The application, or use, of wound rotor, or slip ring, induction motors to drives requiring variable speed has always been limited because of the undesirable quality of such a motor, in that it inherently has series characteristics. In other words, if the load on the motor has any tendency to vary, the speed will vary likewise and the amount of variation will depend upon the speed reduction below synchronous speed at which the motor may be operating at the time.

Mills and industrial plants of all kinds are always faced with the problem of driving one or several machines at variable speeds, and it is always a puzzle as to the best and most economical means for doing this. Direct current motors, with a motor generator set, have a very high first cost. Brush shifting alternating current motors also have a high first cost, and always present, in the case of breakdown, a difficult repair problem. Mechanical variable speed drives also have their disadvantages and problems.

One object of my invention is to provide a shunt characteristic for a slip-ring induction motor.

A broad object of my invention is to provide a substantially constant speed for an alternating current motor for varying loads on the motor.

A further object of my invention is to provide for controlling the circuit characteristics of the secondary winding of a wound rotor induction motor so as to maintain a selected speed for the motor substantially constant though the load on the motor may vary.

A more specific object of my invention is to vary the resistance of the secondary winding of a wound rotor induction motor as a function of the speed of the motor.

It is also an object of my invention to provide a simple, inexpensive, and reliable control for a wound rotor induction motor to get direct-current shunt motor characteristics from such induction motor.

Other objects and advantages will become more readily apparent from a study of the following specification when considered in conjunction with the accompanying drawings in which:

Fig. 1 is a diagrammatic showing of my invention as applied to a slip ring, or wound rotor type, induction motor; and Fig. 2 shows a plurality of typical speed torque curves of an induction motor and also illustrates the characteristic that is secured from a wound rotor induction motor with my system of control.

In my system of control, 1 designates a wound rotor, or slip ring type, induction motor. This induction motor has a pilot generator 2 coupled thereto to be driven at a speed proportional to that of the induction motor. The induction motor may be connected to a suitable source of alternating current represented by the conductors 16, 17, 18 by the contactor 3.

The secondary circuit of the induction motor includes a rheostat 4 having a plurality of sections for each phase, which sections are staggered so as to triple the number of adjustments that can be secured. For a particular application 12 sections per phase have been found satisfactory and I have shown in Fig. 1, 12 sections which are so staggered with reference to the adjusting arms of the rheostat 4 that 36 speed adjusting points may be secured.

The arms of the rheostat 4 are suitably coupled to a reversible rheostat operating motor 5. This rheostat operating motor 5 has a controller 6, having the segments 7, 8 and 9, coupled thereto. This controller 6 coacts with other elements of my system of control presently to be described to aid in the control of the motor 1.

Connected directly into the circuit of the pilot generator 2 is a voltage relay 10, which voltage relay has three positions, namely, a low voltage position, a high voltage position, and a neutral position. In the low voltage position, the voltage relay controls a control relay 50 and in the high voltage position, it controls a control relay 60.

I also provide a suitable push button starting switch 11; a push button stop switch 12; a hand automatic switch 15 which may coact with either, the fast push button switch 13 or the slow push button switch 14; and a pair of transformers 19 and 20 to supply certain control circuits with electrical energy of suitable voltage.

My invention has, of course, general utility. However, one useful application is in a cloth finishing plant for operating continuous dyeing machines. In the dyeing process, the cloth is immersed in a dye solution and then passed through various washes and neutralizer baths and also over various rolls out of solution for setting purposes. Different colors and different cloths require different operating speeds, and also different degrees of setting and neutralizing. Any change in the speed of the cloth going through the machine will have the effect of changing the shade or color of the finished product, which cannot be tolerated. It has been found that friction and other factors vary continuously such that the slip ring motor with a fixed resistance in the secondary circuit does not give satisfactory operating results. My invention solves this problem for this particular application. However, it is to be understood that my invention does not apply to the textile industry only, but applies to any industry where it is desirable to use alternating current motors and yet necessary to get characteristics from such alternating current motors that correspond to the characteristics of a direct current shunt motor.

In the system of control shown in Fig. 1, any speed may, of course, be selected for the induction motor by merely adjusting the adjustable conductor 43 on the rheostat 45 so as to make the voltage relay 10 responsive to some other voltage. If the motor is rated at a speed of 1800 revolutions per minute, many more sections of the resistor 45 may need to be included in the circuit of the voltage relay 10 so as to make this relay operate, for example, for slow speed control at 49 volts, for a neutral position and low control at 50 volts and for high speed control at 51 volts than for a slower speed of the motor. For instance, if the motor 1 is to operate at 900 R. P. M., namely one-half of its rated speed, and at such rated speed is to maintain shunt characteristics, the adjustable conductor 43 is adjusted on the rheostat 45 so as to again cause the voltage relay 10 to be supplied with a voltage in the neighborhood of 50 volts. Its control will, therefore, be the same at the 900 revolutions per minute as at the 1800 revolutions per minute. By suitable adjustment of conductor 43 it is, of course, apparent that any speed within the range of the rheostat 45 may be selected for the motor 1. However, for any speed selected, the voltage responsive relay 10 coacting with the remaining portion of my system of control changes the position of the rheostat arms of the rheostat 4 for changes in load on the motor 1 so as to maintain the speed of motor 1 substantially constant at the selected speed.

A better understanding of the novel features of my invention and the novel results attained can probably be had from a study of a typical sequence of operation of the control system. My system of control provides for automatically positioning the rheostat arms of the rheostat 4 so as to include all of the resistor sections of the rheostat 4 in the circuit prior to the starting of the motor 1. That is, motor 1 cannot be started except the rheostat arms are in the position shown in Fig. 1. Assuming, however, that the rheostat arms are in any position other than that shown at the time of installation and the circuits are arranged as shown in Fig. 1, except that under the assumption made the segments 7, 8, and 9 of the controller 6 coupled to the motor 5 will also be in any other position than that shown. Assuming now that conductors 16, 17 and 18, namely the bus bars, are supplied with alternating current energy. The transformers 19 and 20, coupled to the conductors 21 and 22 connected across bus bars 16 and 18 will, of course, be energized with the result that certain of the control circuits will be supplied with potential.

Immediately upon the energization of transformer 20, an energized circuit will be established from the secondary winding 31 which circuit may be traced from the upper terminal of the secondary winding through the back contact members 23 of the main line contactor 3, conductors 24 and 25, contact finger 26 bridged by the segment 9 of the controller 6, conductor 27, field windings 28 and armature windings 29 of the motor 5 and conductor 30 to the lower terminal of the secondary winding 31. Motor 5 being thus energized will rotate the rheostat arms of the rheostat 4 in a counterclockwise direction until the arms are in the position shown. When the arms are in the position shown, segment 9 will be in the position shown to thus interrupt the circuit for the motor 5 at the contact finger 9. The arms of the rheostat 4 will thus be in the position shown prior to the starting of the motor 1. In fact, motor 1 cannot be started except the rheostat arms are in the position shown because the segment 7 of controller 6 will be in a position to open the circuit for the energizing coil 33 of the line contactor 3 in all positions except when the rheostat arms are in the position shown. I do not only, therefore, provide means for positioning the rheostat arm to the all-resistance-in position before starting of the motor 1 but positively prevent the starting of motor 1 as long as the motor 5 has not finished positioning the rheostat arms as shown.

When the rheostat 4 and the controller 6 have been operated to the position shown, the attendant may start the induction motor 1 by manually actuating the push button switch 11. By so doing, a circuit is established from the energized conductor 21 through conductor 32, segment 7 of the controller 6, start push button switch 11, stop push button switch 12, actuating coil 33 of the main line contactor 3 and conductor 34 to the energized conductor 22. Immediately upon the energization of the actuating coil 33, the line contactor 3 operates to close the contact members 35, 36, 37, 39 and 40 and also causes the opening of the back contact members 23.

Closure of the contact members 35, 36, and 37 effects the energization of the primary winding of the induction motor 1 with alternating current and in consequence motor 1 starts to operate its load, which may be coupled thereto in any suitable manner not shown. Closure of the contact members 39 also establishes a holding circuit for the actuating coil 33 of the line contactor 3. This circuit may be traced from the energized conductor 21 through conductor 38, contact members 39, stop switch 12, actuating coil 33 of line contactor 3 through conductor 34 to the energized conductor 22. The establishment of this holding circuit makes the operation of the motor 1 independent of the starting switch 11 and independent of the position of the segment 7 of the controller 6. That is, motor 1 will continue to operate though the attendant releases the switch 11 and though the motor 5 may operate the controller 6 to position the segment 7 to any position other than the position shown.

As the motor 1 accelerates, and as long as its speed is not up to the speed selected for it by the positioning of the adjustable conductor 43 on the rheostat 45, the voltage of the pilot generator 2 will be small and in consequence the arm 46 of the voltage relay 10 will be in the position shown to thus close a circuit at the contact member 48. The closure of the circuit at the contact member 48 establishes an energizing circuit for the control relay 50 which circuit may be traced from the secondary winding 47 of the transformer 19 through contact members 48, actuating coil 49, conductor 51, back contact member 52 of the relay 70 to the secondary winding 47. Control relay 50 will thus operate to close the contact members 53 whereupon a circuit is established from the secondary winding 31 of the transformer 20 through contact members 40 of the line contactor 3, contact members 53 of the control relay 50, conductor 54, contact finger 55 bridged by the segment 8, field winding 56 of the motor 5 and the armature winding 29 of the motor 5 and conductor 30 to the secondary winding 31. The motor 5 will thus be energized and rotate the rheostat arms of the rheostat 4 in a clockwise direction to increase the speed of the motor. The operation of motor 5 will continue until the motor 1 has attained the speed selected for it by the positioning of conductors 43 on the rheostat 45.

The pilot generator 2 is quite a small generator but is operated on the straight portion of its saturation curve so that its voltage is proportional to its speed and since its field winding 41 is excited from a constant voltage source 42, the operation of the voltage relay 10 will be a reflection of the speed of the generator 2 and thus of the load on motor 1.

As soon as the motor 1 has attained its selected speed, contact member 48 is disengaged by the arm 46 and contact members 53 are, therefore, open by reason of the deenergization of the actuating coil 49 of the control relay 50. The arm 46 of the voltage relay will remain in its neutral position establishing no circuit as long as the speed of motor 1 remains constant. However, in most industrial applications the load on the motor 1 varies and in so doing, the inherent tendency of an induction motor is to vary the speed. However, the instant the speed is varied, the voltage of the generator 2 is varied and in consequence the voltage relay 10 will either close a circuit at the contact member 48 for a speed that is too low, or establish a circuit at contact member 57 for a speed that is too high. Assuming for the moment that the torque or load on the motor decreases which means that its speed will increase and in consequence the voltage of the generator 2 increases and operates the voltage relay 10 to make contact or establish a circuit at the contact member 57 whereupon a circuit is established from the secondary winding 47 of the transformer 19 through arm 46, contact member 57, actuating coil 59 of the control relay 60, conductor 51, back contact member 52 of the relay 70 to the secondary winding 47.

Energization of the actuating coil 59 of the control relay 60 causes the closing of contact member 61 to thus establish a circuit from the secondary winding 31 through contact members 61, conductor 25, contact finger 26 bridged by the segment 9, conductor 27, field windings 28 and armature windings 29 of motor 5 and conductor 30 to the secondary 31. The motor 5 will thus operate the rheostat arms of the rheostat 4 in a counter-clockwise direction to insert more resistance in the secondary circuit to thus decrease the speed of motor 1.

This may be more clearly understood by reference to Fig. 2 of the drawings wherein I have shown a plurality of speed torque curves of an induction motor. Let us assume that point A on the abscissa represents full load torque or the average load on the motor 1 and let point B on the ordinate represent the speed at which the motor 1 is to operate. The motor 1 will thus operate at a point C on its speed torque curve DE. If the load decreases, as was heretofore assumed, the torque decreases and, in consequence, the speed of the motor will increase. Operation will thus be at point F on the speed torque curve DE. In the meantime, the motor 5 operates to insert more resistance. As the resistance characteristics of the secondary circuit are changed, the motor 1 will be caused to operate on a speed torque curve as GH, but since the speed cannot change instantly, the shifting from point F to point I on the curve GH will be substantially in the manner shown. However, immediately after the adjustment has been made by the motor 5 operating on the rheostat 4, the speed will be decreased and operation of the motor will be at point J on the curve GH. If the load on the motor tends to decrease further, more and more resistance is inserted in the circuit and in consequence the speed of the motor 1 is maintained substantially constant regardless of the variations in load.

As I have pointed out, the rheostat 4 has substantially 36 control points which means that successive steps are comparatively small and that the adjustment is a sensitive one yet by reason of the fact that the resistor sections are staggered, hunting is entirely eliminated and the change of the motor operation from one speed torque characteristic to another speed torque characteristic is effected gradually but yet in such a manner to provide the wound rotor induction motor with a characteristic that corresponds to the characteristics of a shunt wound direct current motor.

If the load increases, the speed of motor 1 will decrease from the selected speed and voltage relay 10 will close a circuit at the contact member 48, as shown, with the result that motor 5 is energized through contact members 53. The motor 5 will operate the arms of the rheostat 4 in a clockwise direction to exclude resistor sections from the secondary circuit of the induction motor 1 to thus increase the speed, that is, to cause it to shift from one speed torque characteristic to one having a relatively higher position as is apparent from an inspection of Fig. 2.

It will be noted that segment 8 of the controller 6 is staggered with reference to segment 9 which means that if the rheostat arms are moved in a clockwise direction to their maximum speed limit, the circuit for the motor 5 will be broken at contact finger 55. On the other hand, if the movement of the arms of the rheostat 4 is counter-clockwise to the position shown, the other circuit, namely, the circuit for the reverse operation of motor 5 is broken at contact fingers 26.

If the attendant wishes to stop the motor 1, he actuates the stop switch 12 whereupon the line contactor 3 is deenergized and the motor 1 is disconnected from the bus bars, or conductors 16, 17 and 18. The disconnection of the motor 1 from the source of alternating current does not, however, immediately deenergize the motor 5 because the deenergization of the actuating coil 33 of the line contactor causes the closing of contact members 23 whereupon a circuit is established for motor 5 from the secondary winding 31 through contact members 23, conductors 24 and 25, contact finger 26 bridged by segment 9, conductor 27, field windings 28 and armature windings 29, motor 5 and conductor 30 to the secondary winding 31. The motor 5 will thus move the arms of the rheostat 4 in a counter-clockwise direction until they are positioned as shown, whereupon the circuit for the motor 5 is broken at the contact fingers 26 and the rheostat is in such position that the motor may be restarted the second time.

If, for any reason, the attendant wishes to operate the motor without the automatic control, he may actuate the switch 15 to energize the actuating coil 71 of the relay 70. Operation of relay 70 causes the opening of the contact member 52 to thus remove the control effect of the voltage relay 10 from control relays 50 and 60 with the result that contact members 53 and 51 will remain open. The operation of relay 70 also causes the closing of the contact members 72 and 73. If an attendant wishes to increase the speed of the motor manually he may actuate the push button switch 13 whereupon a circuit is established from the secondary 31 through contact members 72, switch 13, contact finger 55 bridged by segment 8, field winding 56, armature 29 and conductor 30 to the secondary 31. The rheostat arms of the rheostat 4 will thus be moved in a clockwise direction to increase the speed of the motor 1.

If it is desired to decrease the speed of the motor push button switch 14 may be actuated whereupon the motor 5 is energized for moving the arms of the rheostat 4 in a counter-clockwise direction by a circuit that may be traced from the secondary 31 through contact members 73 through switch 14 to conductor 25 and then through the motor as for the circuits heretofore traced.

It will be noted that operation of switch 15 and the selective operation of switches 13 and 14 causes moving of the rheostat arms of the rheostat 4 regardless of whether motor 1 may be operating or not. Ordinarily such operation will serve no useful purpose, and the attendant will normally start the motor 1 by suitable operation of the switch 11 before he actuates either one of the switches 13 or 14. If for any reason, the attendant may wish to start the motor with a low resistance in the secondary circuit, he may, of course, actuate switch 15 and either one of the switches 13 or 14 before starting the motor 1 and thereafter, by closing the knife switch 80 and then actuating the push button switch 11, may cause the motor to operate.

I am, of course, aware that others, particularly after having had the benefit of the teachings of my invention, may devise other circuit diagrams for induction motors for getting shunt characteristics, and I, therefore, do not wish to be limited to the specific showing made in the drawings and the descriptive disclosure hereinbefore made, but wish to be limited only by the scope of the appended claims and such prior art as may be pertinent.

I claim as my invention:

1. In a system of control for a wound rotor induction motor, in combination, a motor having a primary winding and a secondary winding, a variable resistor in the circuit of the secondary winding, and means for automatically increasing the resistance value of the variable resistor before the motor can be energized, and means adapted to automatically decrease the resistance value of said variable resistor during the energization of the motor until the motor has attained a predetermined speed, and means for automatically changing the resistance value of the variable resistor so as to maintain the speed of the motor substantially constant though the motor may be subjected to variable load.

2. In a system of control for a wound rotor induction motor, in combination, an induction motor having a primary winding and a secondary winding, a source of alternating current, switching means for connecting the primary winding to and disconnecting the primary winding from the source of alternating current, a variable resistor connected in circuit relation with the secondary winding, motor means varying the resistance value of said variable resistor, means adapted to energize said motor means when the primary is disconnected from the source of alternating current to increase the resistance value of the variable resistor to a maximum, and means adapted to energize said motor means with the interconnection of the primary winding with the source of alternating current to automatically decrease the resistance value of the variable resistor.

3. In a system of control for a wound rotor induction motor, in combination, an induction motor having a primary winding and a secondary winding, a source of alternating current, switching means for connecting the primary winding to and disconnecting the primary winding from the source of alternating current, a variable resistor connected in circuit relation with the secondary winding, motor means varying the resistance value of said variable resistor, means adapted to energize said motor means when the primary is disconnected from the source of alternating current to increase the resistance value of the variable resistor to a maximum, means adapted to energize said motor means with the interconnection of the primary winding with the source of alternating current to automatically decrease the resistance value of the variable resistor, and means for controlling said motor means to automatically vary the resistance value of the variable resistor as a function of the load on the motor.

4. In a system of control for a wound rotor induction motor, in combination, an induction motor having a primary winding and a secondary winding, a source of alternating current, switching means for connecting the primary winding to and disconnecting the primary winding from the source of alternating current, a variable resistor connected in circuit relation with the secondary winding, motor means adapted to vary the resistance value of said variable resistor, means adapted to energize said motor means when the primary is disconnected from the source of alternating current to increase the resistance value of the variable resistor to a maximum, means adapted to energize said motor means with the interconnection of the primary winding with the source of alternating current to automatically decrease the resistance value of the variable resistor, and means, responsive to a predetermined speed of the induction motor, adapted to control the direction of operation of said motor means to automatically, by either increasing or decreasing the resistance value of the variable resistor, maintain the speed of the induction motor constant.

FREDERICK D. SNYDER.